Jan. 18, 1938. H. BECKER 2,105,631
MOTION PICTURE CAMERA
Filed May 11, 1936 2 Sheets-Sheet 1
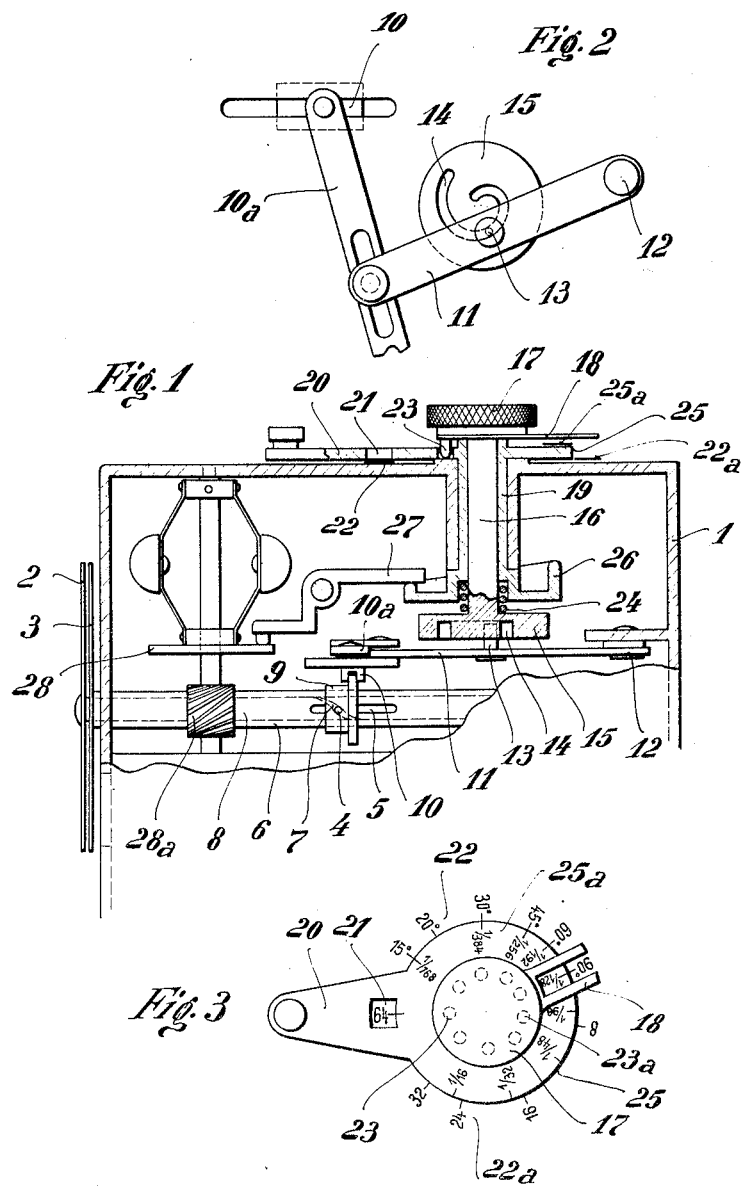

Jan. 18, 1938.                H. BECKER                2,105,631
                         MOTION PICTURE CAMERA
                         Filed May 11, 1936            2 Sheets-Sheet 2
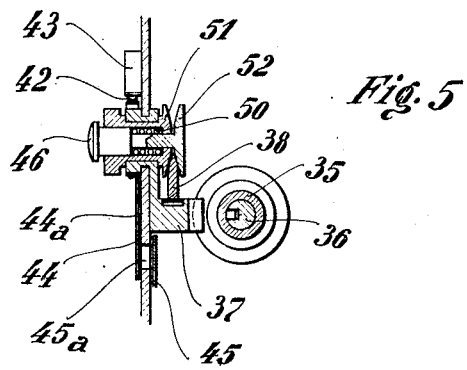
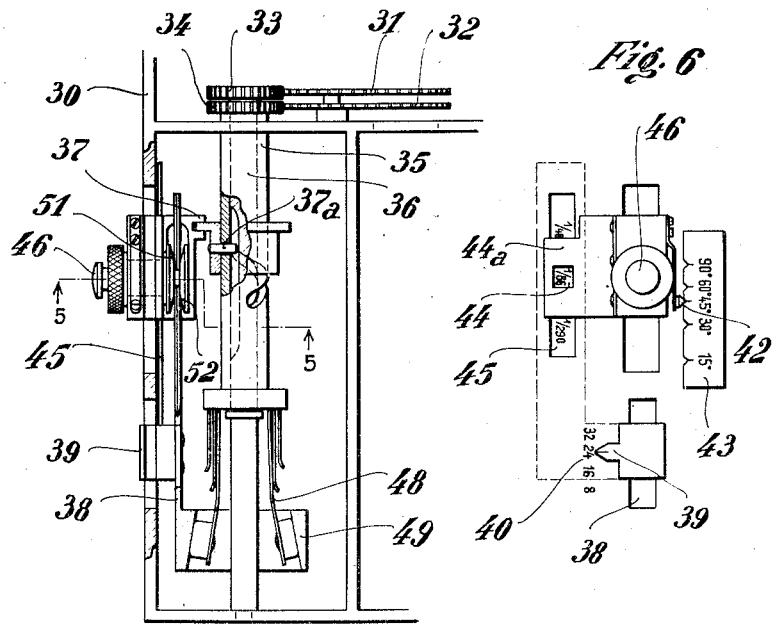

Patented Jan. 18, 1938

2,105,631

UNITED STATES PATENT OFFICE 2,105,631

MOTION PICTURE CAMERA

Helmut Becker, Wetzlar, Germany

Application May 11, 1936, Serial No. 79,044
In Germany May 11, 1935

4 Claims. (Cl. 88—16)

This invention relates to motion picture cameras and has particular reference to improvements in the mechanisms for adjusting the shutter and the picture frequency regulating governor while a predetermined time exposure is maintained. The object of the invention is to provide an adjusting mechanism for the shutter and the said governor or regulator embodying certain novel features of construction and operation whereby the said two elements are so arranged in mutual cooperative relation that either one of them may be operated while maintaining a selected time exposure and which novel mechanism also includes separate independent adjustment of either the shutter or the picture frequency governor.

Prior art disclosures usually require, when one of said elements is to be adjusted and a selected time exposure is to be maintained, a calculation the result of which may be read from a table before the other element is adjusted. With such devices errors occur very easily and one may even forget to adjust the second element. It is also undesirable to require unnecessary manipulations of handles, knobs or like setting or adjusting means. This invention eliminates the disadvantages referred to.

Accordingly the invention is embodied in an adjusting mechanism for the shutter and the picture frequency governor of a motion picture camera arranged and constructed as hereinafter set forth and as illustrated in the accompanying drawings in which Figure 1 is a view of a motion picture camera embodying the invention with parts in section and parts broken away and omitted.

Fig. 2 is a detail view showing certain parts of the shutter adjusting mechanism.

Fig. 3 is a detail view illustrating the operation of the invention.

Fig. 4 is a view of a portion of the camera with parts in section and broken away illustrating a modification.

Fig. 5 is a detailed sectional view of parts shown in Figure 4 on line 5—5 therein.

Fig. 6 illustrates the operation or use of the modified construction of Figure 4.

Referring to Figures 1–3, the camera is designated 1 and is provided with the usual shutter 2—3 adjustable by suitable rotation of a shaft 8 supported within a tubular rotatable shaft 6. The latter is provided with a straight groove 5, while the inner shaft has a curved groove 7. A pin 4 is adapted to be operated in the said two grooves to adjust the shutter in a well known manner. The pin 4 is carried by a sleeve 9 which has a flange in operative engagement with a cam 10. The latter is in turn actuated by levers 10a and 11, the latter being pivoted at 12. The lever 11 has a pin 13 in engagement with a cam groove 14 in a disk 15 carried by a shaft 16 which extends outside the camera where the said shaft carries a knob 17 and a forked pointer 18. The speed governor for regulating the picture frequency is marked 28 and is operatively connected to the shafts 6 and 8 by means of gearing indicated at 28a. The governor is adjusted in a known manner by a bell crank 27 in engagement with a circular cam 26 carried by the tubular shaft 19 which surrounds the aforesaid shaft 16. The shaft 19 also extends outside the camera and carries a scale disk 25 with an operating handle 20 provided with a window 21. The two shafts 16 and 19 are coupled together by means of a pin 23 in the knob 17 which is adapted to engage in any one of a plurality of holes 23a in the scale disk 25. A spring 24 tends to keep the pin 23 in engagement with any one of the holes 23a.

The scale disk 25 carries a scale 25a which has the time exposures marked thereon as shown in Figure 3. The camera carries two scales in operative relation to the time exposure scale. One of these scales 22 is marked in degrees with the angular openings of the shutter corresponding to selected time exposures. The second scale upon the camera is marked 22a and indicates the frequencies of the pictures to be taken.

It will be clear from an inspection of Figure 1 that when either the knob 17 or the handle 20 is operated to rotate the shafts 16 and 19 by way of the coupling pin 23, the cam groove 14 and the cam 26 are rotated and through the instrumentalities described above the shutter is adjusted and the speed governor regulated. If the coupling pin 23 is withdrawn from the disk 25, either of these two elements may be adjusted independently.

Figure 3 shows the positions of the parts when the camera is being operated for instance with a frequency of sixty-four pictures per second and with a time exposure of "1/128". In such a case the shutter will be opened about 90°. The parts will then be in the positions shown in which the window 21 exposes the figure "64" which in turn indicates that the disk 25 and shaft 19 have been moved into a position in which the governor 28 operates the shafts 6 and 8 at a speed which produces sixty-four pictures per second. The forked pointer 18 has been moved into a position straddling the figures "1/128" in the time exposure scale 25a and the figure "90°" in the shutter opening scale and this of course indicates that the shutter is correspondingly opened to ninety degrees by proper rotation of the cam groove 14 and that this opening of the shutter in turn corresponds to the selected time exposure of 1/128.

From this or any other position of the parts the following operations may be carried out. First, it may be desired to operate under a different time exposure while maintaining the same picture frequency. Then the knob 17 is uncoupled by pulling it outwards and rotated until the pointer 18 is set to register with such other selected time exposure. This operation in turn adjusts the shutter to correspond with the new time exposure, but the frequency remains the same because the governor speed has not been changed. If necessary, the handle 20 may be held immovable while the knob is rotated.

Second, the frequency may be varied, reduced or increased, while maintaining the same time exposure. In such case the handle 20 is operated while the shafts 16 and 19 remain coupled so that both the shutter and the governor are adjusted for exposure and speed respectively.

In Figures 4, 5, and 6 which illustrate a modification, the numeral 30 indicates the camera and 31—32 represents the shutter blades which by suitable gearing 33 and 34 are operatively connected to coaxial shafts 35 and 36. A pin 37a operates in grooves corresponding to the grooves 5 and 7 in Figure 1 and is actuated by a guide 37. The tubular shaft 35 carries the governor 48 which is adjusted by a sleeve 49 secured to a guiding rod 38. The latter is at its other end coupled to the shutter adjusting mechanism by means of two disks 51 and 52 which are held in normal engagement by a spring 50, Figure 5. To the disk 52 there is secured an operating knob 46 which corresponds to the knob 17 in Figure 1. 44 indicates a window in a slide 44a which is moved by operating the knob 46. The window is adapted to register with an exposure scale 45 through another window 45a in the side of the camera. The guide rod 38 carries a pointer 39 adapted to register with a picture frequency scale 40. The disk 51 carries outside the camera a pointer 42 operating over a shutter opening scale 43.

The operation is similar to that described above. Figure 6 illustrates a condition in which the camera is operated at a frequency of twenty-four pictures with an exposure of "1/86" corresponding to a shutter opening of 45°. If now the frequency is to be increased while maintaining the same exposure, then the pointer 39 is moved to "32" for instance. This in turn changes the position of the sleeve 49 and the governor is correspondingly adjusted, but the exposure has not been changed. If the exposure is to be changed then the disks 51 and 52 are uncoupled by pressure of the knob 46 and they are then moved until the window 44 registers with the new exposure but the frequency of "24" has not been disturbed.

I claim:—

1. In a motion picture camera including a shutter and a picture frequency regulating governor, means for adjusting the shutter to accord with any selected time exposure, means for regulating the governor to accord with a selected frequency of pictures to be taken irrespective of the selected time exposure, coaxially supported shafts for actuating the said adjusting and regulating means and a coupling member for operating the said shafts simultaneously at said selected time exposure after having been adjusted as aforesaid, said coupling member being operable to afford individual operations of the said shafts.

2. In a motion picture camera including a shutter and a picture frequency regulating governor, means for adjusting the shutter, means for regulating the speed of the governor, two shafts within the camera for actuating said adjusting and regulating means, a fixed visible shutter opening scale and a fixed visible picture frequency scale on the outside of the camera, a handle for operating one of said shafts to regulate the speed of the governor to accord with the said picture frequency scale, said handle having a window for observing the scale, a time exposure scale on said handle, a knob for operating the other of said shafts to adjust the shutter to accord with the said time exposure scale and means for operatively connecting the said two shafts to simultaneously adjust the said shutter and governor.

3. A motion picture camera according to claim 2 including means for coaxially supporting the said two shafts within the camera.

4. In a motion picture camera including a shutter and a picture frequency regulating governor, means for adjusting the shutter, means for regulating the governor, two coaxially supported shafts within the camera for actuating the said regulating and adjusting means, a shutter opening scale and a picture frequency scale on the outside of the camera, a handle for operating one of the said shafts to regulate the speed of the governor to accord with the said picture frequency scale, a scale on said handle for indicating time exposures, a member for operating the other shaft to adjust the shutter to accord with the shutter opening scale and a marker on said member for observing the time exposure operation of the said member and other shaft with respect to the said time exposure scale.

HELMUT BECKER.